United States Patent [19]

Rhoad

[11] Patent Number: 5,521,655
[45] Date of Patent: May 28, 1996

[54] CAMOUFLAGE EYEWEAR

[75] Inventor: Don F. Rhoad, West Columbia, S.C.

[73] Assignee: Camovision, Inc., Cayce, S.C.

[21] Appl. No.: 328,139

[22] Filed: Oct. 24, 1994

[51] Int. Cl.[6] .................................................. G02C 11/02
[52] U.S. Cl. ............................ 351/51; 351/52; 351/53
[58] Field of Search .................................. 351/51, 52, 53,
351/49, 47, 57, 44, 41, 158

[56] References Cited

U.S. PATENT DOCUMENTS

| | | | |
|---|---|---|---|
| D. 309,618 | 7/1990 | Evans | D16/102 |
| D. 347,015 | 5/1994 | Saik | D16/112 |
| 3,413,057 | 11/1968 | Carmichael . | |
| 4,673,609 | 6/1987 | Hill | 428/187 |
| 4,715,702 | 12/1987 | Dillon | 351/44 |
| 4,740,069 | 4/1988 | Baum | 351/57 |
| 4,812,031 | 3/1989 | Evan | 351/47 |
| 5,182,586 | 1/1993 | Bennato | 351/47 |
| 5,229,796 | 7/1993 | Nitta | 351/47 |

FOREIGN PATENT DOCUMENTS 110894  10/1918  United Kingdom .

*Primary Examiner*—William L. Sikes
*Assistant Examiner*—Hung Xuan Dang

[57] ABSTRACT

Camouflage eyewear for use with military and hunting activities to conceal the wearer's eyes and eye movements in addition to the upper part of the face and temple region. The eyewear has a design formed on the outside portion of the lens that is visible when looking at the wearer of the glasses, but not visible to the wearer whose view is generally unobstructed. The camouflage eyewear may also be worn with conventional eyeglasses.

22 Claims, 1 Drawing Sheet

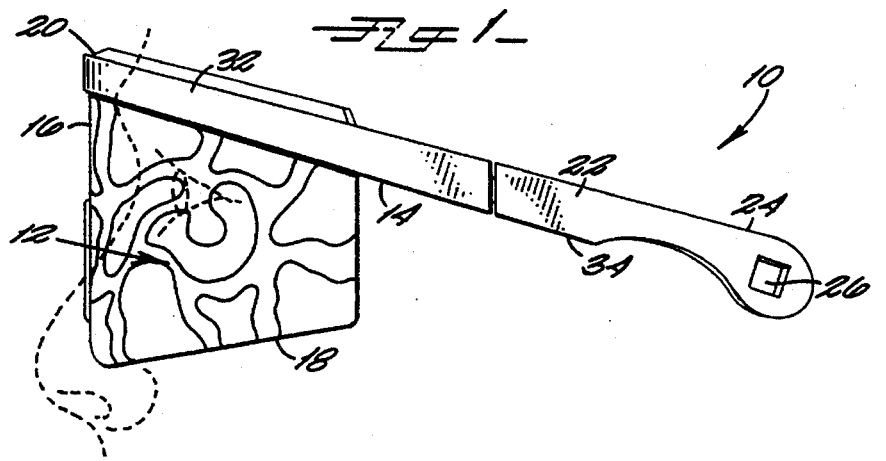
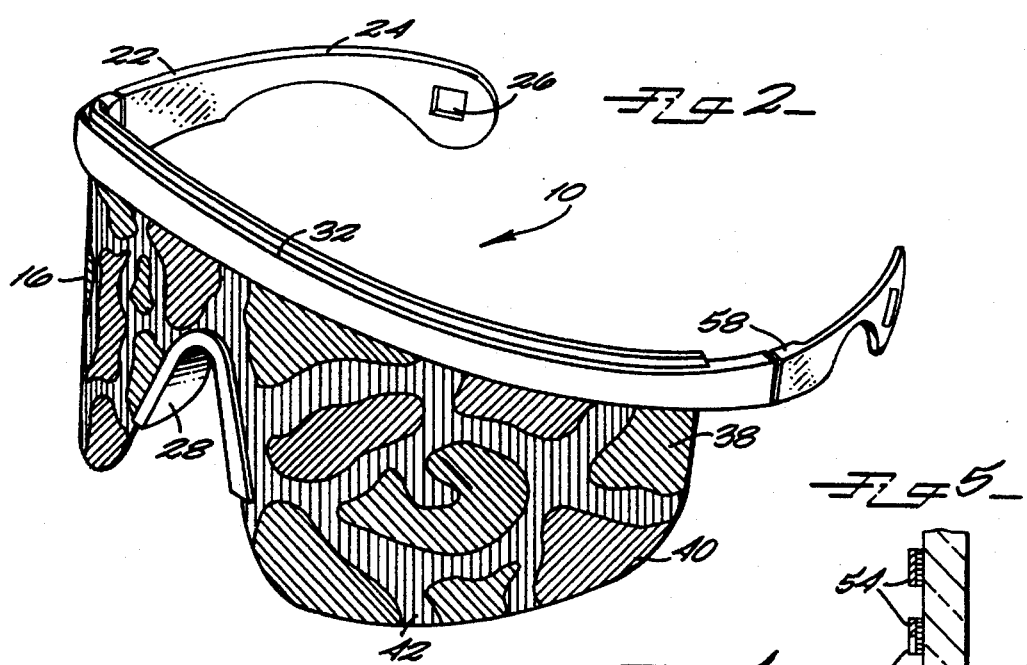
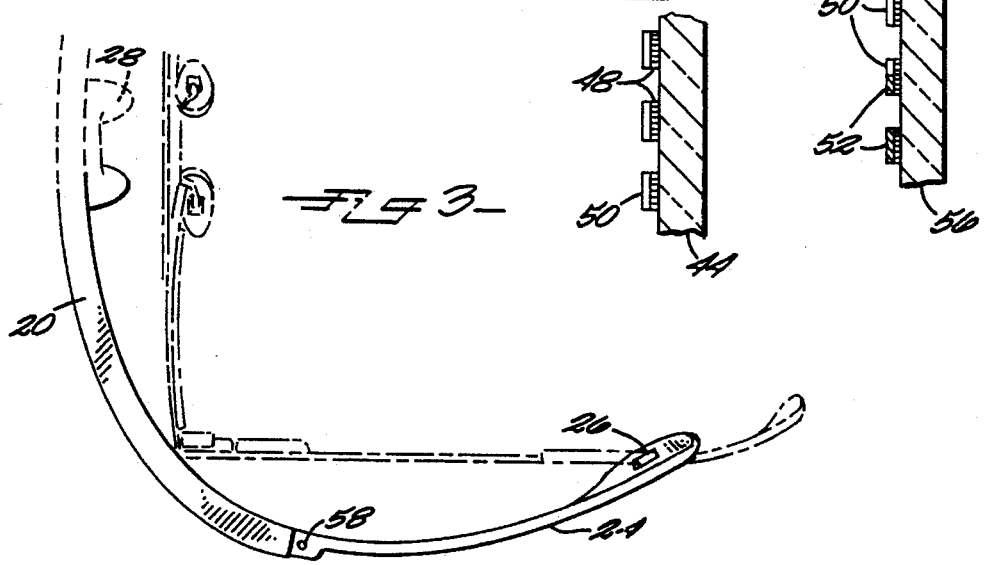
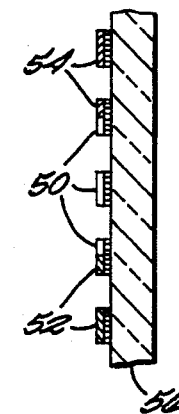

CAMOUFLAGE EYEWEAR

BACKGROUND OF THE INVENTION

1. Field of the Invention

The present invention relates to camouflage gear for the face. More specifically, the present invention relates to camouflage eyewear that covers the eyes, upper part of the face and temple region, in the form of wrap around eye glasses.

2. Discussion of Background

Seasoned hunters and specialized military personnel understand the need to cover parts of the body with apparel that blends into the surrounding environment. Coverage of the human eye with a camouflage material is especially important so that the movement of the eye will not give away a position. This is of particular importance when hunting animals with a keen sense of vision such as turkeys. Therefore, it is important to the success of the person desiring not to be seen to effectively cover or camouflage their eyes as well as the remainder of their person.

A previous solution to this problem was suggested in Evans, U.S. Pat. No. 4,812,031 who attached camouflage netting to the lenses of conventional eye wear. While the glasses disclosed in Evans conceal the hunters eyes, the netting used as a camouflage interferes with the field of vision of the wearer. In other words, the wearer sees the same camouflage design as a person viewing the wearer. Furthermore, the conventional eyeglasses disclosed in Evans only adequately cover the eyes ventrally or from a direct straight-on view of the person, and do not cover the lateral portion or periphery of the eyes. Therefore, the whites of the eyes and the movement of the eyes am not concealed from a side view of the wearer.

In an analogous field, spectators at a sporting event may be seen wearing novelty glasses having various lens decorations, such as team logos, on the lenses. People viewing the glasses worn by the wearer see only the team logo or design on the glasses, whereas the wearer has an unobstructed or tinted field of vision. Two methods that achieve this unidirectional transparent effect on one side of the panel, while displaying an ornamental design on the other side of the panel, are disclosed in Dillon, U.S. Pat. No. 4,715,702, and Hill, U.S. Pat. No. 4,673,609.

Dillon teach lenses having a decorative pattern readily apparent to an observer, but not apparent to the wearer, so that the wearer sees only a uniform color or hue that does not interfere with the wearer's vision. The structure of the lens comprises a positive decorative pattern on a first layer, a reflective layer, and a third layer incorporating a negative decorative pattern. The negative pattern cancels the decorative image so that the wearer sees only a uniform tint.

Hill discloses a unidirectional panel which comprises a transparent or translucent material having on one or both sides a design superimposed on, or forming part of, an opaque pattern so that the design on one side of the panel cannot be seen from the other side. This allows a person on one side of the panel to have an transparent view through the panel, whereas, a person on the opposite side of the panel sees only the design applied to the panel.

A need exists for a device that adequately and entirely conceals a hunter's eyes without obstructing the vision of the wearer. Although it is known to produce decorative sunglasses using the current method, Applicant is unaware of an attempt to produce camouflage eyewear for the eyes and upper part of the face by this method.

SUMMARY OF THE INVENTION

According to its major aspects and broadly stated, the present invention is camouflage eyewear for the eyes and upper portion of the face. Further, the present invention is eyewear worn by a wearer to conceal the eyes of the wearer from other people, animals or other viewing devices that may view the wearer, while allowing the wearer to have an unobstructed field of vision.

The eyewear comprises a lens having an inside and outside portion, the outside portion being visible to others viewing the wearer who is wearing the eyewear; the inside portion being visible to the wearer and being closer to the wearer than the outside portion. A camouflage design is formed on the outside portion of the lens so that the design is visible while viewing the wearer, thus concealing the wearer's eyes. In contrast, the wearer's field of vision is unobstructed while looking through the lens. The camouflage eyewear further includes a means for supporting the lens on the face of the wearer. The support means is connected to the lens and comprises a support frame.

In a preferred embodiment, the support frame comprises a frontal portion, two arms hingedly attached to the frontal portion, and a nose portion connected to the lens. The two arms extend adjacent to the temple region of the wearer and over and around the ear of the wearer. The nose cushion helps support the eyewear. The support frame can be black or any suitable color; however, the frame is preferably a camouflage design similar to the design formed on the lens. The camouflage design formed on the outside portion of the lens and frame is comprised of colors that blend into the surrounding environment.

A feature of the present invention is that the glasses wrap around the curvature of the human face and temple region so as to completely cover the wearer's eyes, including the peripheral vision of the wearer, so that the whites of the eyes and the movements of the eye are not visible to one viewing the wearer. In a preferred embodiment, the lens employed is a single lens that extends around the curvature of the wearer's face. The wrap-around feature also provides coverage of the upper portion of the face and temple region, so that this area of the body blends into the surroundings.

Furthermore, a feature of the present invention is that the camouflage pattern is seen on one side of the lens and not seen from the other side of the lens. This feature allows for the wearer's vision to be unobstructed while the wearer's eyes blend into the surrounding environment. It is very important for hunters and military personnel to have a clear, unobstructed field of vision.

A further feature of the present invention is a means for securing conventional eyewear to the camouflage eyewear. In a preferred embodiment, each arm of the support frame has a hole for securing conventional eyeglasses to the eyewear. Therefore, wearers who wear correctional eyeglasses can wear the present invention over their eyeglasses.

An additional feature of the present invention is that the camouflage eyewear is light-weight and comfortable. This allows for the eyewear to be comfortably worn while hunting. In addition, the light comfortable wrap-around design allows for the present invention to be worn comfortably as a camouflage covering over conventional eyewear.

Still a further feature of the present invention is that the lens of the present invention may be such that the wearer sees a tint, hue or color for bright conditions, or the lens may be such that the wearer's field of vision is clear, so that the present invention can be worn as an effective cover during periods of little or no sunlight. This is very important to military personal who may use this gear as an effective covering during periods of little or no light. In addition, this allows hunters to cover their eyes without interfering with their vision in the early morning hours, which is often the best time for hunting. In addition, a wearer may chose a tinted lens so as to block the intensity of the sun.

Another feature of the present invention is that the lens is preferably substantially non-reflecting so that the reflection of the sun from the lens will not give away the position of the person desiring not to be seen.

Other features and advantages of the present invention will be apparent to those skilled in the art from a careful reading of the Detailed Description of a Preferred Embodiment presented below.

BRIEF DESCRIPTION OF THE DRAWINGS

In the drawings,

FIG. 1 is a side view of the present invention, showing how the eye, temple region and the upper portion of the face is covered;

FIG. 2 is a perspective view of the present invention, illustrating a camouflage pattern on the lens and the curvature of the eyewear;

FIG. 3 is a top view of the present invention showing one-half of the symmetrical embodiment of the invention, demonstrating how the present invention can be worn over conventional glasses; and FIG. 4 is a transverse sectional view through a lens having a two layer silhouette pattern;

FIG. 5 is a sectional view similar to FIG. 4 of a lens having a silhouette pattern and a camouflage design on one side of the pattern.

DETAILED DESCRIPTION OF A PREFERRED EMBODIMENT

The present invention is camouflage eyewear for concealing the eyes and upper portion of the face of the wearer. The camouflage gear comprises a lens that effectively wraps around the natural curvature of the face and temple region of the wearer, providing a light weight, comfortable means of concealment. The lens is supported by a frame that preferably extends across the top portion of the lens; however, the frame may encompass the entire perimeter of the lens. The frame is either attached to or comprises two arms, one on each side of the wearer's head, that extend from the frontal portion of the frame adjacent to the wearer's temple region, over and around the ear, as in conventional eye glasses. The lens contains an inside portion and an outside portion; the inside portion being closer to the wearer and being visible to the wearer. The outside portion is visible when looking at the glasses when the glasses are being worn by the wearer.

A design is formed on the outside portion of the lenses. The design is visible when looking at the wearer of the glasses, but not visible to the wearer. Therefore, the wearer's field of vision is unobstructed by the pattern formed on the lenses, but the design effectively conceals the eyes and upper portion of the face. A wearer's field of vision is the normal viewing area of a human.

The design applied is a "camouflage" pattern. A camouflage pattern is a pattern comprised of shapes and colors intended to blend into the surrounding environment in order to conceal. The camouflage pattern can comprise brown, green, orange, black, white, blue shades and combinations thereof, and any color that blends into the terrain in which something is being concealed. The colors and shapes employed will depend on the season of the year as well as the terrain.

The camouflage eye wear can be a pair of eyeglasses, however, the present invention is preferably a lens (clear or tinted) supported by a lightweight frame, wherein the lens and the frame wrap around the curvature of the face so that the lens covers the frontal or ventral portion of the face as well as the lateral or peripheral portion of the face, as can be seen in FIG. 1, a side view, and FIG. 2, a perspective view of the camouflage eyewear. The present invention 10 comprises an elongated frame 20 extending across the forehead of the wearer, and further extending adjacent to the wearer's temple region and over and around the ears of the wearer to help support the eyewear. The frame 20 can comprise one or more sections, for example, in the preferred embodiment illustrated in FIGS. 1 and 2, the frame comprises three portions, a curved frontal support portion 32 that extends the length of the forehead, and two arm portions 22, one on each side of the wearer's head, that extend adjacent to the temple region and over the ears. The two arm portions are connected by a hinge means 58 on each side of the frontal support portion of the frame. The hinge mechanism allows the arms to rotate inwardly so that the arms can fold toward the lens for compact storage, analogous to conventional glasses. The arms 22 comprise a portion extending adjacent to the temple 34 and a curved end portion 24 for extending around and behind the wearer's ear, thus providing support. The curved end portion of the arm has an opening or hole 26 so that the armatures of a conventional pair of eyeglasses can fit through and thus attach to the present invention, as shown in FIG. 4. Conventional eyewear typically has two armatures, the present invention preferably comprises a frame 20 with two arms 22, each of the two arms has a hole 26 for receiving an armature of the eyeglasses so that the eyeglasses are secured to the eyewear of the present invention. This means of attachment allows the wearer of correctional eyeglasses to attach the two pair of glasses so that both pair of eyeglasses are comfortably supported on the face of the wearer. This allows for the concealment of the wearer's eyes from every angle while allowing the wearer to wear corrective eyeglasses.

Connected and extending downwardly from the frame support is the lens 12, which comprises a frontal curved portion 16 extending simultaneously with the frame, concealing the eye region, the bridge of the nose and the face from about the top of the nose to the eyebrows as shown in FIG. 1. The lens 12 extends around the face of the wearer to effectively conceal the lateral portion of the face and temple region. The side portion of the lens 18 conceals the periphery of the eye, so that the wearer's eye is concealed from every angle.

As illustrated in FIG. 2, a V shaped nose support 28 is connected to the lens 12. The nose support 28 or conventional bridge support may be one piece as shown or a more conventional two pad support. The preferred one piece nose support 28 aids the support of the eyewear upon the bridge of the wearer's nose.

A camouflage pattern is applied to the outer portion of the lens 12. The pattern is preferably applied by the method taught in Hill, U.S. Pat. No. 4,673,609. The pattern as seen in FIGS. 1 and 2, can comprise as many different colors as needed to adequately blend into the surrounding environment. In the preferred embodiment, the pattern comprises three colors or shades, represented by 38, 40 and 42. It is understood that the camouflage pattern can be composed of many different patterns and colors. As in any type of camouflage covering, whether it be on clothes, vehicles or instruments, the colors and patterns are varied depending on the environment and season. Therefore, it is understood that the following list of colors and camouflage patterns are only examples and should not be considered a comprehensive listing. Examples of camouflages that may be used as patterns on the lens and frames of the present invention are: LEAF-E-FLAGE, TREE-LEAF CAMO, ASAT CAMO BY BRIGADE QUARTERMASTER, TIMBER GHOST CAMOUFLAGE, PREDATOR CAMOUFLAGE, TREEBARK CAMOUFLAGE, MOSSY OAK TREESTAND, REAL TREE CAMO, ROCKKAFLAGE CAMO, and SKYLINE ULTIMATE CAMOUFLAGE. The camouflage pattern can comprise green, brown, gray, black, white, orange, red, blue shades and combinations thereof, and any color that may help the device blend into the surrounding environment.

In the present invention, the camouflage design is applied to a transparent or translucent material that is suitable for making panels used for eyewear or eyeglasses of any type. Transparent or translucent material includes but is not limited to acrylic sheets, polycarbonate sheets, polyester film, polychloride film, or any other plastic suitable for making transparent material used for eyewear. The lens material can be either reflecting or nonreflecting, however, in the preferred embodiment of the invention, the lens and frame material are substantially nonreflecting. Reflectivity is defined as the reflective brightness of a surface, measured by the light traveling to the surface of the material verses the light given off or reflected by the surface. Nonreflecting or low reflecting materials reflect light diffusely. The lens is preferably non-reflective, so that the reflection of the sun from the lens will not give away the position of the person desiring not to be seen.

The formation of camouflage designs of differing colors on the lens is preferably applied using the process disclosed in U.S. Pat. No. 4,673,609, herein incorporated by reference. However, other suitable methods that may be used are disclosed in U.S. Pat. No. 4,715,702, and British Patent Application Nos. 2,032,417A and 2,118,096, each of the above are herein incorporated by reference.

The unidirectional panels as disclosed in U.S. Pat. No. 4,673,609, comprise an opaque pattern of dots or discreet print elements, 1 mm in diameter and at a distance of 1.4 mm between the centers of the adjacent dots on a square grid appearing white from one side and black from the other side, the other side being less illuminated than the one side. Light incident on the white dots is reflected and scattered, which has the effect of obscuring visibility from the one side into the other side. However, a substantially clear view is obtained from the other side through the lens into the one side, albeit the intensity of light of the image is reduced by virtue of the degree of opacity, giving a toned down effect to the image, not dissimilar to tinted transparent lens.

In the present invention, there is provided a lens comprising a colorless or light colored sheet of material and a camouflage design visible from one side of the lens and not visible from the other side of the lens, the design being superimposed or forming part of the pattern. The lens of the invention may also allow for the control of solar heat gain, glare or UV radiation received within the camouflage eyewear as with conventional sunglasses.

The design is formed on the outside lens by printing a silhouette pattern of discreet print elements carried on the outside portion of the lens. The camouflage pattern is subsequently printed on the outside portion of the lens in the form of discreet print elements. The camouflage pattern carried by the lens of the invention forms or is superimposed on a pattern of opaque elements which is referred to as a silhouette pattern. The term "silhouette pattern", as herein used, is intended to mean any arrangement of opaque material which subdivides the lens into a plurality of opaque areas and/or a plurality of transparent or translucent areas. The silhouette pattern can form many different types of camouflage patterns containing many different colors. The elements forming the silhouette pattern are normally small, such as dots, preferably of equal size on a regular grid, sometimes referred to in the printing industry as "half tone."

A cross section of the lens is shown in FIGS. 4 and 5. The lens in FIG. 4 has a regular pattern of dark ink 48 on one side of the sheet 44 and is superimposed by light colored or light reflective ink 50. When viewed from the front (that is from the left as illustrated in FIG. 4) the light colored pattern 50 has the effect of inhibiting vision through the panel. From the other side, the less reflective dark pattern does not prevent vision through the panel. This one way effect is further enhanced if the level of illumination on the front of the panel is greater than at the rear.

The cross section of the lens shown in FIG. 5, is similar to that of FIG. 4 except that part of the light colored ink pattern 50 is replaced with ink of a different colors 52 and 54. The relative arrangement of the inks 50, 52 and 54 represent the three different colors used in the camouflage patterns. Thus, when viewed from the front, the lens displays a camouflage pattern, however, when viewed from the rear the design cannot be seen, but the panel will appear transparent.

The preceding description of the invention is illustrative only and changes may be made by one of ordinary skill in the art, particularly with regard to matters of shape, size and arrangement of the frame, lens or lenses and pattern, within the scope of the invention, as interpreted by the broad general meaning of the terms in which the claims are expressed.

What is claimed is:

1. An eyewear device to conceal the eyes of a wearer while allowing the wearer to see, said device comprising:

a support frame;

a lens attached to said support frame having an inside portion and an outside portion;

a camouflage design carried by said lens and visible from said outside portion of said lens but not visible from said inside portion of said lens.

2. An eyewear device as recited in claim 1, wherein said camouflage design comprises:

a silhouette pattern carried on said lens; and a camouflage pattern carried on said silhouette pattern.

3. An eyewear device as recited in claim 1, wherein said camouflage design comprises:

a silhouette pattern carried on said outside portion of said lens; and a camouflage pattern carried by said silhouette pattern.

4. An eyewear device as recited in claim 1, wherein said lens wraps around the face of said wearer so that said eyes are concealed.

5. An eyewear device as recited in claim 1, wherein said support frame carries said camouflage design.

6. An eyewear device as recited in claim 1, wherein said support frame includes means for securing eyeglasses thereto.

7. An eyewear device as recited in claim 1, wherein said support frame includes two arms having means for securing eyeglasses thereto.

8. An eyewear device as recited in claim 1 for use with eyeglasses having two armatures, wherein said support frame includes two arms, each arm of said two arms having a hole formed therein for receiving an armature of said eyeglasses so that said eyeglasses are secured to said eyewear device.

9. An eyewear device as recited in claim 1, further comprising a nose cushion connected to said lens.

10. An eyewear device as recited in claim 1, wherein said support frame has a black surface.

11. An eyewear device as recited in claim 1, wherein said lens is substantially transparent.

12. An eyewear device as recited in claim 1, wherein said lens is tinted.

13. An eyewear device to conceal eyes of a wearer, said device comprising:

a support frame;

a lens attached to said support frame and having an inside portion and an outside portion;

a camouflage design carried by said support frame and by said outside portion of said lens.

14. An eyewear device as recited in claim 13, wherein said lens wraps around the face of said wearer.

15. An eyewear device as recited in claim 13, further comprising a nose cushion connected to said lens.

16. An eyewear device as recited in claim 13, wherein said camouflage design comprises:

a silhouette pattern carried on said lens; and a camouflage pattern carried on said silhouette pattern.

17. An eyewear device as recited in claim 13, wherein said camouflage pattern carried said lens is visible on said outside portion but on visible on said inside portion.

18. An eyewear device as recited in claim 13 for use with eyeglasses, further comprising means formed in said support frame for secure eyeglasses thereto.

19. An eyewear device for use with eyeglasses to conceal eyes of a wearer, said device comprising:

a support frame having means for securing said eyeglasses;

a lens attached to said support frame and having an inside portion and an outside portion;

a camouflage design on said outside portion of said lens.

20. An eyewear device as recited in claim 19, wherein said eyeglasses have two armatures, and wherein said securing means further comprises two arms, each arm of said two arms having a hole for receiving one armature of said eyeglasses to secure said eyeglasses to said eyewear device.

21. An eyewear device as recited in claim 19, wherein said lens wraps around the face of said wearer to conceal said eyes.

22. An eyewear device as recited in claim 19, wherein said camouflage design comprises:

a silhouette pattern carried on said lens; and a camouflage pattern carried on said silhouette pattern, said camouflage design visible from said outside portion but not visible from said inside portion.

* * * * *